(12) United States Patent
Leimann

(10) Patent No.: US 7,942,078 B2
(45) Date of Patent: May 17, 2011

(54) STRUCTURAL CONNECTION OF A MOTOR AND GEAR UNIT

(75) Inventor: Dirk Olaf Leimann, Edegem (BE)

(73) Assignee: Hansen Industrial Transmissions N.V., Edegem (BG)

( * ) Notice: Subject to any disclaimer, the term of this patent is extended or adjusted under 35 U.S.C. 154(b) by 922 days.

(21) Appl. No.: 11/579,924

(22) PCT Filed: May 11, 2005

(86) PCT No.: PCT/BE2005/000072
§ 371 (c)(1),
(2), (4) Date: Nov. 8, 2006

(87) PCT Pub. No.: WO2005/111470
PCT Pub. Date: Nov. 24, 2005

(65) Prior Publication Data
US 2007/0227295 A1    Oct. 4, 2007

(30) Foreign Application Priority Data

May 13, 2004   (GB) .................................. 0410784.3

(51) Int. Cl.
*F16H 57/02*    (2006.01)
(52) U.S. Cl. ................. 74/606 R; 74/421 R; 248/205.1; 248/639; 248/640; 248/674; 310/91
(58) Field of Classification Search ............... 74/421 A, 74/421 R, 606 R, 841; 248/200, 205.1, 316.8, 248/674, 225.21, 639, 640; 310/91
See application file for complete search history.

(56) References Cited

U.S. PATENT DOCUMENTS

| 1,836,225 | A | * | 12/1931 | Christensen ................. 74/421 R |
| 2,101,515 | A | | 12/1937 | Schmitter |
| 2,596,794 | A | | 5/1952 | Schmitter |
| 2,918,825 | A | | 12/1959 | Bade |
| 3,395,594 | A | | 8/1968 | Balair |
| 3,796,108 | A | | 3/1974 | Kime et al. |
| 3,883,794 | A | * | 5/1975 | Sivley .............................. 322/41 |
| 5,160,113 | A | * | 11/1992 | Whiddon ....................... 248/638 |
| 5,944,568 | A | * | 8/1999 | Rabal .............................. 440/53 |

FOREIGN PATENT DOCUMENTS

| FR | 2244937 | 4/1975 |
| GB | 1442839 | 7/1976 |
| WO | 03/068511 | 8/2003 |

OTHER PUBLICATIONS

Patent Abstracts of Japan, vol. 018, No. 628 (M-1713), Nov. 30, 1994.

* cited by examiner

*Primary Examiner* — Richard W Ridley
*Assistant Examiner* — Thomas Diaz
(74) *Attorney, Agent, or Firm* — Young & Thompson

(57) ABSTRACT

A structural connector for providing a structural interconnection between the housing of a gear unit and the housing of an electric motor, the structural connector being of a modular type including a base member adapted for connection to at least one of the housing of an electric motor and the housing of a gear unit, and at least two side wall members, the side wall members having a motor end adapted for connection to one of an electric motor housing and the base member and a gear end adapted for connection to a gear unit housing, the side wall members lying at least in substantial part in a plane inclined at an angle of at least 60 degrees relative to a plane containing at least a part of the base member, and the side wall members being spaced apart by connection to an interposed housing.

29 Claims, 2 Drawing Sheets

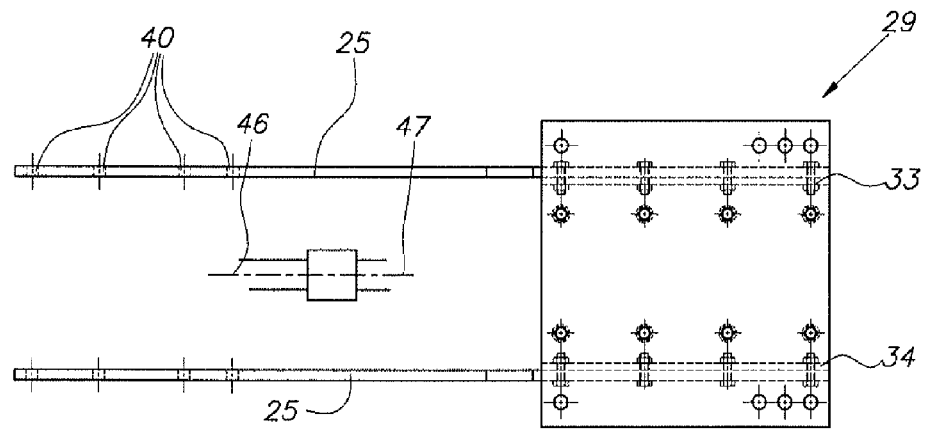
*Fig.4*
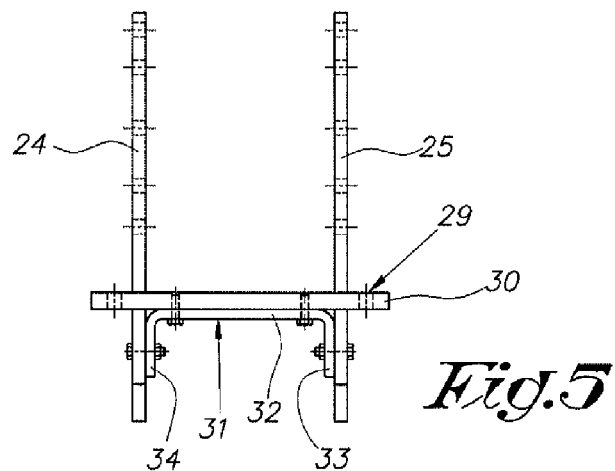
*Fig.5*
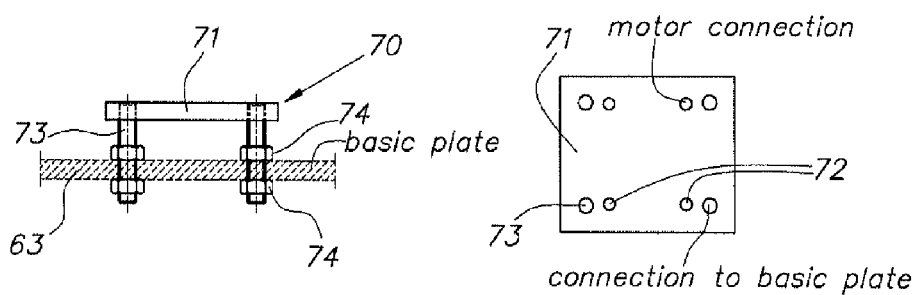
*Fig.6*   *Fig.7*

STRUCTURAL CONNECTION OF A MOTOR AND GEAR UNIT

FIELD OF THE INVENTION

This invention relates to a structural connector for providing a structural interconnection between the housing of a gear unit and the housing of an electric motor.

The invention relates also to a gear unit housing adapted for use with the structural connector of the present invention and to a gear unit assembly comprising a gear unit and structural connector secured to the gear unit housing.

The invention relates in particular, but not exclusively, to a structural connector for providing a structural interconnection between a foot-mounted type electric motor and either a right angle or parallel type gear unit whereby said electric motor and gear unit are positioned for torque transmission therebetween and may be supported, by means of the structural connector, relative to equipment to which an output shaft of the gear unit is connected.

BACKGROUND OF THE INVENTION

For driving conveyors it is common to employ shaft mounted gear units of the kind comprising a hollow shaft. To connect the gear unit in an aligned relationship with a foot-mounted motor and other components such as brakes it is common to employ a structural support bed as shown in FIG. 1 and comprising an integral assembly of welded components, or a casting, that provides base plate surfaces to which the gear unit and electric motor are respectively mounted. Standardisation of the design of the structural support beds is difficult because of the variation of sizes and heights of the motors and gear units which it may be wished to interconnect, and also the required spacing of the gear unit and motor, for example to accommodate different types of couplings and brakes. Furthermore, the manufacture, handling and transportation of the support beds is difficult, particularly for those structural support beds required to be of great length. Thus the present design is expensive and inconvenient.

SUMMARY OF THE INVENTION

One object of the present invention is to provide a structural connector, a gear unit housing, and a gear unit housing assembly in which at least some of the aforedescribed disadvantages of known structural support beds are mitigated or overcome.

In accordance with one of its aspects the present invention provides a structural connector for providing a structural interconnection between the housing of a gear unit and the housing of an electric motor, said structural connector being of a modular type comprising a base member adapted for connection to at least one of the housing of an electric motor and the housing of a gear unit, and at least two side wall members, said side wall members having a motor end adapted for connection to one of an electric motor housing and the base member and a gear end adapted for connection to a gear unit housing, said side wall members lying at least in substantial part in a plane inclined at an angle of at least 60 degrees relative to a plane containing at least a part of the base member, and said side wall members being spaced apart by connection to an interposed housing.

Preferably said relative angle is at least 80 degrees, more preferably 90 degrees, said relative angle being that as considered in a plane perpendicular to the rotational axis of the electric motor.

Said base member may be adapted also for connection to the housing of an electric motor.

If the base member is connected only to the gear unit and not to the electric motor, it is taught by the present invention that preferably the motor end of the side wall members shall be secured to each of the base member and electric motor.

If the base member is not connected to the gear unit, it is taught by the present invention that preferably the gear end of the side wall members is connected to the base member.

One or each of a side wall member and base member may comprise at least two sections, typically integral with one another, in which case it is to be understood that the above referred relative angle is to be considered as the angle between substantial parts of each of the members such that each member serves to reinforce and inhibit distortion of the other member.

At least one of a side wall member and base member may comprise two sections each substantially planar and displaced to lie in planes spaced apart but substantially parallel with one another. Each said section may be apertured or provided with other means to facilitate attachment of the housing of a gear unit or an electric motor.

The side wall members may be spaced apart by a base member which is connected thereto or may be spaced apart by connection to an interposed housing.

Preferably the side wall members each lie in a respective plane which is substantially perpendicular to the direction in which the members lie spaced apart.

The side wall members of a pair preferably each lie at an angle of at least 60 degrees relative to said direction in which they are spaced apart by the base member, more preferably at least 80 degrees. A 90 degree, i.e. perpendicular, orientation is particularly preferred for most installations.

Each side wall of a pair may comprise a spacer section between said gear end and motor end. Said motor end and spacer section may each be of substantially elongate shape, and the spacer section may extend in a direction inclined relative to a lengthwise direction of the motor end. The side walls of a pair may be substantially identical thereby to allow a symmetrical assembly.

The motor end may be preformed with slots or holes for attachment of a side wall to a base member or a motor housing, for example by means of bolts. Similarly, the gear end may be preformed with holes for connection to a gear unit housing. The gear end also may be profiled to abut closely against a profile formed on the outer surface of the gear unit housing thereby to provide a mechanical interlock to augment an interconnection provided by bolts extending through the gear end of a side wall to the housing of the gear unit.

The base member may be preformed with holes or slots for attachment thereto of a foot-mounted electric motor.

The base member may be of a bent type construction comprising a flanged edge or pair of edges extending perpendicular to a central base section, and apertures or like location means may be provided in the or each flange portion for attachment of a side wall. Thus the invention envisages that a side wall member may be secured to a base member either substantially directly or, alternatively or additionally, via the housing of a gear unit or electric motor.

Although it is envisaged that typically the motor may be mounted directly to the base unit, to minimise or reduce the number of different base members potentially required for different applications, an intermediate spacer unit may be provided to interconnect between a motor and base member. Similarly, an intermediate member may be provided between the motor and a side member.

The present invention also teaches the provision of a series of structural connectors comprising a plurality of identical base members, and side wall members of substantially bespoke manufacture. The side wall members may, for example, be formed by laser cutting or burned ready cut in form and with screw or bolt holes. The standardised base members likewise may be manufactured by laser or burned ready cut in form and with bolt or screw holes.

Whilst the invention teaches the provision of a series of structural connectors, and which may involve use of side wall members which are each of substantially bespoke manufacture, the present invention further teaches that the side wall members need not each be of substantially bespoke manufacture. There may a plurality of side wall members each adapted to connect to a mounting face of one or a plurality of types of gear unit or electric motor housings of a total range of types of housings, and said side wall members of each type having a second mounting region for the housing of the other of an electric motor and gear unit, said second mounting section being adapted to allow for selective positioning of the other of the electric motor and gear unit relative to the side wall member. Typically, for example, the second mounting region of a side wall member may comprise a plurality of mounting holes at least some of which are of an elongate shape thereby to accommodate a range of different standard housing mounting positions.

In accordance with another of its aspects the present invention provides a gear unit housing wherein, as considered relative to the rotational axis of the gear unit input shaft, the gear unit housing is provided with a pair of mounting faces at substantially diametrically opposite positions.

As considered in a plane perpendicular to said rotational axis, the mounting faces of the gear unit housing preferably lie in planes between which the included angle is less than 60 degrees, more preferably less than 20 degrees. It is particularly envisaged that the mounting faces may be contained in respective planes which are parallel relative to one another. It is further preferred that the mounting faces are each equally spaced in distance from said rotational axis.

Each mounting face may be provided with screw threaded apertures for location bolts whereby a respective side wall of a structural connector of the present invention may be secured to that face.

The present invention envisages that the gear unit housing is manufactured by moulding or casting of metal or plastics material and that the mounting face formed by said manufacturing process may be utilised for contact by a side wall member without further machining (other than machining as may be required to form screw threaded apertures), though the option for further machining is not excluded.

Said substantially diametrically opposite positions of the gear unit housing outer surface may be provided with abutments each for location with the gear end of a respective one of a pair of structural connector side walls.

The present invention further provides in another of its aspects a gear unit assembly comprising a gear unit housing and a structural connector of the present invention. The assembly may comprise a pair of side walls arranged with the gear ends of said pair of side walls of the structural connector secured to respective mounting faces of the gear unit housing.

The spacing of the motor ends of a pair of side walls as defined by an interposed base member may correspond with the spacing of the gear ends of the side walls as defined by the mounting faces of the gear unit housing. Alternatively, said respective spacings may intentionally differ whereby on bolting together of the side wall members to the base member and gear unit housing there results a preloading of the side wall members thereby to enhance their stiffness and resist deformation under the action of torque forces transmitted in use between the motor and gear unit.

Preferably, as considered in the plane of each side wall member of a pair, each side wall is connected to the gear unit housing at positions either side of the rotational axis of the gear unit input shaft.

BRIEF DESCRIPTION OF THE DRAWINGS

The invention will now be described by way of example with reference to accompanying drawings in which:

FIG. 4 is a plan view in the direction X of FIG. 3;

FIG. 5 is an end view in the direction of arrow Y of FIG. 3;

FIGS. 6 and 7 show plan and end views of an intermediate spacer unit for use in an assembly whereby a motor and a gear unit are supported by a base plate and their axes are not equally spaced from said base plate.

DETAILED DESCRIPTION OF EMBODIMENTS

Figure 1:
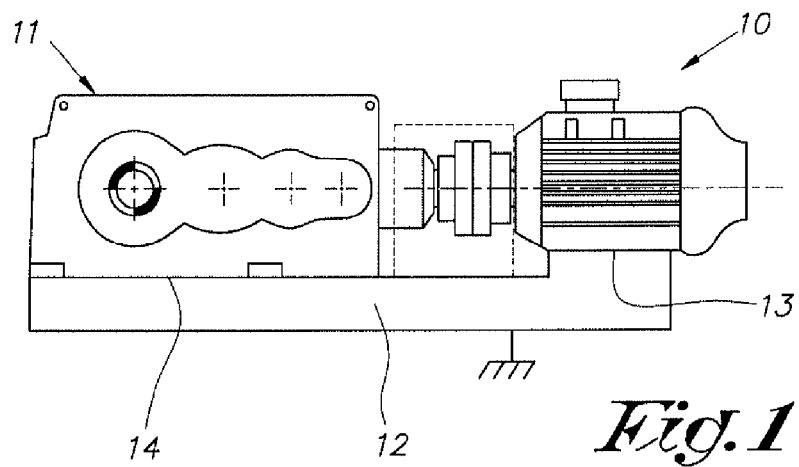
FIG. 1 is a side view of a known motor and gear unit assembly.

FIG. 1 shows an electric motor 10 and a gear unit 11 each having mounting feet which are secured to a cast iron support bed base plate 12. The base plate 12 has machined surfaced regions 13,14 to which the motor and gear unit are respectively secured. In order to ensure that alignment of the rotational axis of the motor and the gear unit is not adversely affected, it is necessary to ensure that the machining of the surfaces 13, 14 of the support bed is accurately controlled.

Figure 2:
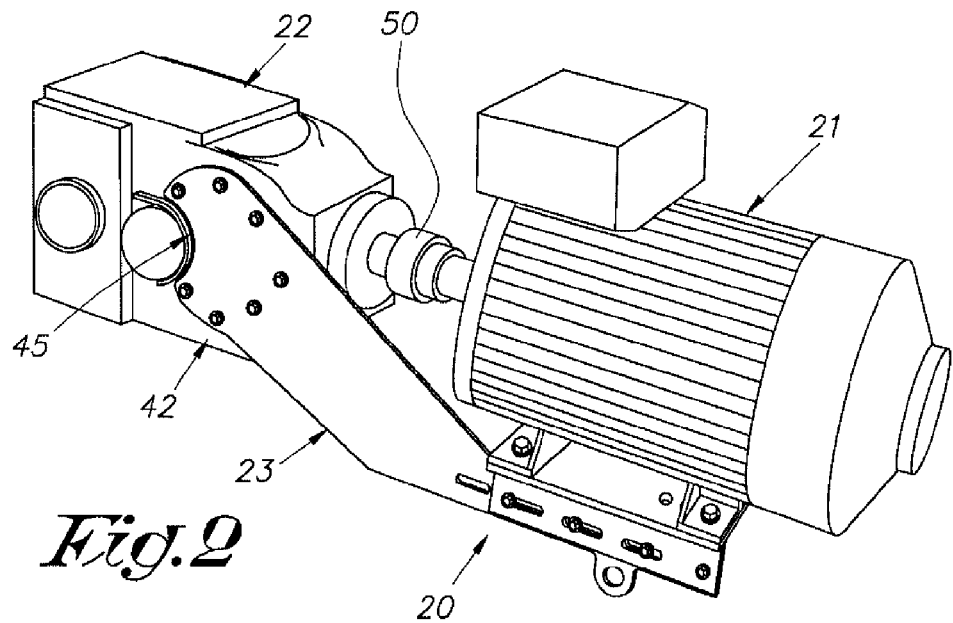
FIG. 2 is a perspective view of a motor and gear unit assembly of the present invention.

A gear unit and motor assembly in accordance with the present invention is illustrated in FIG. 2.

A foot mounted type electric motor 21 is connected to a gear unit 22 by means of a structural connector 23 which will now be described in more detail with reference to FIGS. 3 to 5.

The structural connector comprises two side wall members 24, 25 each comprising a motor end 26, a gear end 27 and a spacer section 28.

The structural connector additionally comprises a base member assembly 29 comprising a base plate 30 secured to a bent metal base support 31 comprising a central section 32 which underlies the base plate 30 and two side wall flanges 33, 34 which extend downwards perpendicularly relative to the central section 32. Elongate apertures 35 are formed in each side wall motor end and the flange portions 33, 34 are formed with circular apertures whereby the base and side walls may be bolted together, with axial spacing (relative to the rotational axes of the motor and gear unit) being selectively adjustable in situ having regard, for example, to the dimensional variations of a coupling device 50 connecting the motor and gear unit.

Each gear end 27 of a side wall is formed with a plurality of holes 40 for retention bolts by means of which the side wall can be bolted to one of the mounting faces 42 (see FIG. 2) provided at respective diametrically opposite regions of the housing of the gear unit 22.

Each gear end additionally comprises a concave edge surface 44 said to lie, in the assembly, in close abutment against the raised formation 45 of the gear unit housing adjacent the flange region 42.

Figure 3:
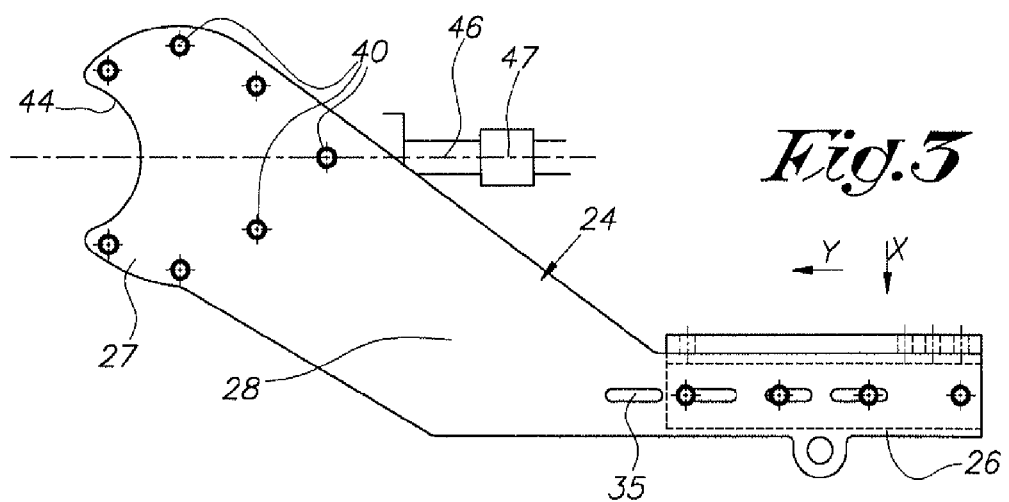
FIG. 3 is a side view of a structural connector of the present invention.

The rotational axes 46, 47 of the gear unit input shaft and the motor output shaft are shown in FIGS. 3 and 4, and from FIG. 3 it will be seen that the holes 40 are positioned, as considered in the plane of the side wall 24, and in a direction perpendicular to the axis 46, to lie symmetrically about that axis.

The invention envisages that spacer members may be utilised to provide the required alignment with mounting faces.

In a construction which comprises a motor and gear unit for which the axes of the motor and gear unit are not equally spaced from a planar base plate, use may be made of an intermediate spacer unit 70 as shown in FIGS. 6 and 7. The unit 70 comprises a support plate 71 provided with four holes 72 for connection to the housing of a motor (or gear unit) and four screw threaded studs 73 positioned to align with holes in a base plate. By providing each stud with a pair of nuts 74 to lie one above and one below the base plate it us possible easily to secure the plate 71 at a desired spacing from the base plate such that either a gear unit or motor can be secured to the plate 71 in a manner which ensures alignment of the motor shaft and gear unit input.

By virtue of the present invention it is possible to provide a structural connection of a motor and gear unit which is more easily fabricated and of lighter construction than the conventional support bed. Furthermore, because the base portion of the structural connector can be standardised for a range of electric motors, and because the side wall members can readily be cut and apertured in accordance with specific requirements without substantial time delay, potential warehousing costs and delivery times are reduced.

The invention claimed is:

1. A structural interconnection, comprising:
a housing of a gear unit;
a housing of an electric motor; and
a structural connector connecting said housing of the gear unit and said housing of the electrical motor, said structural connector being modular and comprising:
a base member connected to at least one of said housing of the electric motor and said housing of the gear unit, and
at least two side wall members, said side wall members having a motor end connected to one of said housing of the electric motor and the base member, and a gear end connected to said housing of the gear unit, at least one of said side wall members lying at least in substantial part in a plane inclined at an angle of at least 60 degrees relative to a plane containing at least a part of the base member, and said side wall members are spaced apart with said housing of the gear unit interposed there between,
wherein the gear end of at least one of said side wall members has a profile that abuts against a profile formed on an outer surface of the housing of the gear unit to form a mechanical interlock, and
wherein said gear end of said at least one of said side wall members comprises a curved concave edge surface that lies in abutment against a raised formation of the housing of the gear unit adjacent a flange region,
wherein said mechanical interlock augments interconnection provided by bolts which extend through the gear end of a side wall to the housing of the gear unit,
wherein the gear end of a side wall is formed with a plurality of holes for retention bolts by means of which the side wall can be bolted to the housing of the gear unit to one of two mounting faces formed on the housing of the gear unit and provided at respective diametrically opposite regions of the housing of the gear unit, and
wherein said holes are positioned to lie symmetrically about an input axis, symmetrically with respect to a first plane through said input axis as well as to a second plane which is perpendicular to said first plane.

2. The structural interconnection according to claim 1, wherein said relative angle is at least 80 degrees.

3. The structural interconnection according to claim 2, wherein said relative angle is 90 degrees.

4. The structural interconnection according to claim 1, wherein said base member is adapted also for connection to the housing of the other of the electric motor and gear unit.

5. The structural interconnection according to claim 1, wherein at least one of a side wall member and base member comprises two sections each substantially planar and which are displaced to lie in planes spaced apart but substantially parallel with one another.

6. The structural interconnection according to claim 5, wherein each said section is provided with apertures to facilitate attachment of the housing of a gear unit or an electric motor.

7. The structural interconnection according to claim 1 and comprising two side wall members, said side wall members being spaced apart by a base member which is connected thereto.

8. The structural interconnection according to claim 7, wherein each of the two side wall members lie at an angle of at least 60 degrees relative to said direction in which they are spaced apart by the base member.

9. The structural interconnection according to claim 8, wherein said relative angle is at least 80 degrees.

10. The structural interconnection according to claim 9, wherein said side wall members lie perpendicular relative to the two said directions in which they are spaced apart.

11. The structural interconnection according to claim 7, wherein each side wall of said two side wall members comprises a spacer section between said gear end and said motor end.

12. The structural interconnection according to claim 11, wherein said motor end and spacer section each are of substantially elongated shape and said spacer section extends in a direction inclined relative to the length wise direction of the motor end.

13. The structural interconnection according to claim 1, wherein the base member is preformed with means for attaching a foot mounted electric motor to said base member.

14. The structural interconnection according to claim 1, wherein the base member is of a bent type construction comprising a flanged edge or a pair of edges extending perpendicular to a central base section and location means is provided in the or each flange portion for attachment to a side wall.

15. The structural interconnection according to claim 1, and comprising an intermediate spacer unit to provide interconnection between a motor and base member.

16. A standardised series of structural connectors each of the type as recited in claim 1, said series comprising a plurality of substantially identical base members and a plurality of side wall members of substantially bespoke manufacture.

17. A standardised series of structural connectors each of the type as recited in claim 1, said series comprising a plurality of substantially identical base members and a plurality of side wall members each adapted to interconnect to a mounting face of a plurality of different types of gear unit housings or electric motor housings of a range of types of housings.

18. The series according to claim 17, wherein said side wall members of each type have a second mounting region for the housing of the other of the electric motor and the gear unit, said second mounting region being adapted to allow for selective positioning of the other of the electric motor and the gear unit relative to the side wall member.

19. The structural interconnection according to claim 1, wherein the housing of the gear unit, when considered relative to a rotational axis of a gear unit input shaft, is provided with a pair of mounting faces at substantially diametrically opposite positions, said mounting faces mount the structural connector to the housing of the gear unit.

20. The structural interconnection according to claim 19, wherein the mounting faces lie in planes between which an included angle is less than 60 degrees.

21. The structural interconnection according to claim 20, wherein said included angle is less than 20 degrees.

22. The structural interconnection according to claim 21, wherein said mounting faces are contained in respective planes which are parallel relative to one another.

23. The structural interconnection according to claim 19, wherein said mounting faces are equally spaced in distance from said rotational axis.

24. The structural interconnection according to claim 19, wherein each of said mounting faces is provided with screw threaded apertures for location bolts whereby a respective side wall of a structural connector is secured to a corresponding mounting face.

25. The structural interconnection according to claim 19, wherein substantially diametrically opposite positions of an outer surface of the housing of the gear unit are provided with abutments each for interlocking location with the gear end of a respective one of a pair of structural connector side walls.

26. The structural interconnection according to claim 1, wherein the gear ends of a pair of side walls of the structural connecter are secured to respective mounting faces of the housing of the gear unit.

27. The structural interconnection according to claim 26, wherein the housing of the gear unit, considered relative to a rotational axis of a gear unit input shaft, is provided with a pair of mounting faces at substantially diametrically opposite positions, said mounting faces mount said structural connector to the housing of the gear unit.

28. The structural interconnection according to claim 27, wherein a spacing of the motor ends of a pair of planar side wall members differs from a spacing of the gear ends of the side wall members so as to preload the side wall members.

29. A structural connector that provides a structural interconnection between a housing of a gear unit and a housing of an electric motor, said structural connector being modular and comprising:
  a base member adapted for connection to at least one of a housing of an electric motor and a housing of a gear unit, and
  at least two side wall members, said side wall members having a first end adapted for connection to one of an electric motor housing and the base member and an opposing second end adapted for connection to a gear unit housing, said side wall members lying in substantial part in a plane inclined at an angle of at least 60 degrees relative to a plane containing at least a part of the base member, and respective second ends of said side wall members are spaced apart from each other and are free of any structure connecting said second ends together, except when connected to a gear unit housing,
  wherein the second end of at least one of said side wall members has a profile configured to abut against a profile formed on an outer surface of a gear unit housing thereby to provide a mechanical interlock, when the structural connector is connected to a gear unit housing, and
  wherein said second end of said at least one said side wall members comprises a curved concave edge surface that lies, when assembled to a gear unit housing, in abutment against a raised formation of a gear unit housing,
  wherein said mechanical interlock augments interconnection provided by bolts which extend through the gear end of a side wall to the housing of the gear unit,
  wherein the gear end of a side wall is formed with a plurality of holes for retention bolts by means of which the side wall can be bolted to the housing of the gear unit to one of two mounting faces formed on the housing of the gear unit and provided at respective diametrically opposite regions of the housing of the gear unit, and
  wherein said holes are positioned to lie symmetrically about an input axis, symmetrically with respect to a first plane through said input axis as well as to a plane which is perpendicular to said first plane.

* * * * *